(12) United States Patent
Saettone et al.

(10) Patent No.: US 12,391,628 B2
(45) Date of Patent: Aug. 19, 2025

(54) SLOW RELEASE FERTILIZING COMPOSITION, AND PROCESS FOR PRODUCING THE SAME

(71) Applicant: BIO-ON S.P.A., San Giorgio di Piano (IT)

(72) Inventors: Paolo Saettone, San Giorgio di Piano (IT); Luca Del Bene, San Giorgio di Piano (IT); Tommaso Avellini, San Giorgio di Piano (IT); Mauro Comes Franchini, San Giorgio di Piano (IT)

(73) Assignee: BIO ON S.P.A., Turin (IT)

( * ) Notice: Subject to any disclaimer, the term of this patent is extended or adjusted under 35 U.S.C. 154(b) by 890 days.

(21) Appl. No.: 17/429,824

(22) PCT Filed: Feb. 13, 2020

(86) PCT No.: PCT/IB2020/051182
§ 371 (c)(1),
(2) Date: Aug. 10, 2021

(87) PCT Pub. No.: WO2020/165820
PCT Pub. Date: Aug. 20, 2020

(65) Prior Publication Data
US 2021/0387925 A1 Dec. 16, 2021

(30) Foreign Application Priority Data
Feb. 14, 2019 (IT) .................. 102019000002149

(51) Int. Cl.
*C05G 3/40* (2020.01)
*B05D 1/02* (2006.01)
(Continued)

(52) U.S. Cl.
CPC ............. *C05G 3/40* (2020.02); *B05D 1/02* (2013.01); *B05D 3/0406* (2013.01); *C05C 9/005* (2013.01); *C05G 5/37* (2020.02)

(58) Field of Classification Search
CPC ... C05G 3/40; C05G 5/37; B05D 1/02; B05D 3/00406; C05C 9/005; C05C 1/02; C05C 5/02; Y02P 60/21; C05B 7/00; B01J 2/006
See application file for complete search history.

(56) References Cited

U.S. PATENT DOCUMENTS 5,645,624 A * 7/1997 Naka ..................... C05G 5/37
71/64.11
2008/0134737 A1 6/2008 Binder et al.
(Continued)

FOREIGN PATENT DOCUMENTS

CN 107759365 A 3/2018
CN 108976005 A * 12/2018
(Continued)

OTHER PUBLICATIONS

International Search Report issued Jun. 8, 2020 re: Application No. PCT/IB2020/051182, pp. 1-3, citing: WO 2017/087264 A1, US 2008/134737 A1, CN 107 759 365 A and US 2012/149844 A1.
(Continued)

*Primary Examiner* — Jennifer A Smith
(74) *Attorney, Agent, or Firm* — CANTOR COLBURN LLP (57) ABSTRACT

A slow release fertilizer composition includes particles of a nitrogen fertilizer coated with at least one layer having at least one polyhydroxyalkanoate (PHA), the at least one layer having an average thickness between 1 μm and 200 μm. The relative production process is also described. The slow release fertilizer composition provides for the use of biodegradable and biocompatible materials that allow a slow
(Continued)

release of the fertilizer in the culture medium, according to the current regulations, without causing the accumulation of products which are harmful for the environment.

15 Claims, 4 Drawing Sheets

(51) Int. Cl.
    *B05D 3/04*     (2006.01)
    *C05C 9/00*     (2006.01)
    *C05G 5/30*     (2020.01)

(56) References Cited

U.S. PATENT DOCUMENTS

| | | |
|---|---|---|
| 2012/0149844 A1 | 6/2012 | Whitehouse |
| 2020/0255355 A1* | 8/2020 | Venkatramesh ........ C05F 11/08 |
| 2020/0262766 A1* | 8/2020 | Kannan .................. B01J 2/006 |

FOREIGN PATENT DOCUMENTS

| | | |
|---|---|---|
| RU | 2347608 C2 | 2/2009 |
| WO | 9923146 A1 | 5/1999 |
| WO | 2011045625 A1 | 4/2011 |
| WO | 2015015315 A2 | 2/2015 |
| WO | 2017087264 A1 | 5/2017 |

OTHER PUBLICATIONS

Juan D. Giraldo et al. "Determination of urea using p-N, N-dimethylaminobenzaldehyde: Solvent effect and Interference of chitosan", J. Chil. Chem. Soc., 2017, vol. 62, No. 2, pp. 3538-3542.
Written Opinion issued Jun. 8, 2020 re: Application No. PCT/IB2020/051182, pp. 1-5, citing: WO 2017/087264 A1, US 2008/134737 A1, CN 107 759 365 A and US 2012/149844 A1.

* cited by examiner

SLOW RELEASE FERTILIZING COMPOSITION, AND PROCESS FOR PRODUCING THE SAME

TECHNICAL FIELD

The present disclosure relates to a slow release fertilizer composition, and to the process for producing the same. In particular, the present disclosure relates to a slow release fertilizer composition comprising particles of a nitrogen fertilizer coated with at least one layer of a biodegradable polymer.

BACKGROUND

Fertilizers are substances used in agriculture and gardening that allow creating, replenishing, conserving or increasing the fertility of a soil. Depending on the type of characteristic they confer to the soil, fertilizers are divided into:
- manure, which enrich the soil with one or more nutrients;
- soil improvers, which improve the physical properties of the soil, altering its structure and/or texture;
- soil correctors, which shift the pH of the soil towards more neutral values.

Nitrogen fertilizers, urea specifically, are among the most used fertilizers in agriculture thanks to their high nitrogen content. In fact, many bacteria present in the soil have an enzyme, urease, which is able to hydrolyse urea into ammonia and carbon dioxide, thus making nitrogen available for the metabolism of the vegetable crops.

Nitrogen fertilizers are commercially available in subdivided form, for example pearls or granules. Since these products are highly water soluble, they are subject to rapid dispersion within the soil. They are usually introduced during sowing, or scattered on the surface of the soil itself. In general, it is desirable to avoid the nitrogen fertilizer coming into direct contact with the seed, as it could alter the regular development of sprouts.

However, the rapid solubility of nitrogen fertilizers in the water contained in the soil causes an initial, sudden increase in the concentration of nitrogen, which decreases rapidly due to the washout caused by the water that penetrates the soil. These changes in the concentration of nitrogen in the soil are obviously not in line with the needs of the crop. This forces the farmer to repeatedly administer the fertilizer in order to optimize the life cycle of the sown crop, from which numerous adverse environmental effects derive.

In fact, nitrogen fertilizers such as urea release nitrates into aquifers and nitrogen oxides in the atmosphere, which interfere with the ozone present in the stratosphere. In particular, the environmental overload of nitrogen occurs when the concentration of nitrogen released into the soil exceeds the ability of the vegetation and soil microflora to metabolize it. Hence the need to limit the use of nitrogen fertilizers, in order to guarantee nitrogen concentrations that can actually be absorbed by the vegetation.

The challenge of many fertilizer producers is therefore to provide a product wherein the release of the nutrient (nitrogen in the specific case) inside the soil is synchronized with the nutritional needs of the crop.

As for nitrogen fertilizers, slow release products are currently on the market, in particular with a urea base, in which the fertilizer particles are coated with a semi-permeable layer that is able to regulate the dissolution of the fertilizer in the soil.

According to European standard EN 13266:2001, a fertilizer can be defined as "slow release" if, under the conditions defined by the standard at a temperature of 25° C., the nutrients are released, with respect to the initial weight:
- no more than 15% in 24 hours;
- no more than 75% in 28 days;
- at least about 75% at the time stated by the producer.

The slow release fertilizers currently on the market have a semi-permeable layer made with synthetic polymers of petroleum origin, such as polypropylene (PP), polyethylene (PE), polyurethanes (PU). However, these polymers are not biodegradable or biocompatible and are therefore disadvantageous from the point of view of eco-sustainability, as they tend to accumulate in the soil treated with the fertilizer, which is generally used in massive quantities.

SUMMARY

The Applicant has therefore posed the problem of developing a slow release fertilizer composition through the use of biodegradable and biocompatible materials, which would allow a gradual release of the fertilizer into the culture medium according to current regulations without causing the accumulation of products which are harmful to the environment.

The Applicant has now found that this problem, and others that will be better illustrated below, can be solved by coating the particles of a nitrogen fertilizer with at least one polyhydroxyalkanoate (PHA) so as to obtain a layer having a predefined thickness.

In a first aspect, the present disclosure therefore relates to a slow release fertilizer composition comprising particles of a nitrogen fertilizer coated with at least one layer comprising at least one polyhydroxyalkanoate (PHA), said at least one layer having an average thickness comprised between 1 μm and 200 μm.

Preferably, the nitrogen fertilizer particles have an average size comprised between 0.5 mm and 20 mm. Preferably, the nitrogen fertilizer particles are in granular form. Preferably, the layer comprising at least one PHA has an average thickness comprised between 5 μm and 150 μm.

Preferably, the PHA is present on the fertilizer particles in an amount comprised between 0.5% and 15% by weight, more preferably between 1 and 10% by weight, with respect to the weight of the fertilizer.

Preferably, the nitrogen fertilizer is soluble in water. Preferably, the nitrogen fertilizer is selected from: urea, potassium nitrate, ammonium nitrate, ammonium phosphate, mixtures of fertilizers N:P:K, or mixtures thereof. Even more preferably, the nitrogen fertilizer is urea.

As is known, polyhydroxyalkanoates (PHA) are organic polymers produced by microorganisms isolated from natural environments or even by genetically modified microorganisms, and are characterized by a high biodegradability and biocompatibility.

They are produced and accumulated by various species of bacteria under unfavourable growth conditions and in the presence of a source of excess carbon. PHAs are synthesized and accumulated by about 300 different microbial species, included in more than 90 genuses of Gram-positive and Gram-negative bacteria, such as for example *Bacillus, Rhodococcus, Rhodospirillum, Pseudomonas, Alcaligenes, Azotobacter, Rhizobium*.

In bacterial cells, PHA is stored in the form of microgranules, whose size and number per bacterial cell varies in different species. They appear as refractive inclusions under an electron microscope, with a diameter ranging from 0.2 to 0.7 μm.

Preferably, the PHA is a polymer containing repeating units of formula (I):

—O—CHR$_1$—(CH$_2$)$_n$—CO— (I)

where:
R$_1$ is selected from: alkyls C$_1$-C$_{12}$, cycloalkyls C$_4$-C$_{16}$, alkenyls C$_2$-C$_{12}$, optionally substituted with at least one group selected from: halogen (F, Cl, Br), —CN, —OH, —OOH, —OR, —COOR (R=C$_1$-C$_4$ alkyl, benzyl);
n is zero or an integer from 1 to 6, preferably 1 or 2.

Preferably, R$_1$ is methyl or ethyl, and n is 1 or 2.

The PHAs can either be homopolymers, copolymers or terpolymers. In the case of copolymers or terpolymers, they can consist of different repeating units of formula (I), or of at least one repetitive unit of formula (I) in combination with at least one repetitive unit deriving from comonomers that are able to copolymerize with hydroxyalkanoates, such as lactones or lactams. In the latter case, the repeating units of formula (I) are present in an amount equal to at least 10% in moles with respect to the total number of repetitive units.

Particularly preferred repeating units of formula (I) are those deriving from: 3-hydroxybutyrate, 3-hydroxyvalerate, 3-hydroxyhexanoate, 3-hydroxyoctanoate, 3-hydroxyundec-10-enoate, 4-hydroxyvalerate.

Particularly preferred PHAs are: polyhydroxybutyrate (PHB), poly-3-hydroxyvalerate (PHV), poly-3-hydroxyhexanoate (PHH), poly-3-hydroxyoctanoate (PHO), poly(3-hydroxybutyrate-co-3-hydroxyvalerate) (PHBV), poly(3-hydroxybutyrate-co-3-hydroxyhexanoate) (PHBH), poly(3-hydroxybutyrate-co-4-hydroxybutyrate), poly(3-hydroxyoctanoate-co-3-hydroxyundecen-10-enoate) (PHOU), poly(3-hydroxybutyrate-co-3-hydroxyvalerate-4-hydroxyvalerate) (PHBVV), polyhydroxybutyrate-hydroxyvalerate copolymer, or mixtures thereof.

According to the purposes of the present disclosure, particularly preferred PHAs are polyhydroxybutyrate (PHB) and poly (3-hydroxybutyrate-co-3-hydroxyvalerate) (PHBV).

PHAs suitable for the present disclosure preferably have an average molecular weight (Mw) comprised in the range from 5,000 to 1,500,000 Da, more preferably from 100,000 to 1,000,000 Da. The average molecular weight can be determined according to known techniques, in particular by means of GPC analysis (Gel Permeation Chromatography).

With regard to the production of PHAs, it is preferably obtained from the microbial fermentation of an organic substrate (for example carbohydrates or other fermentable substrates, such as glycerol) using a strain of microorganisms capable of producing PHAs, and the subsequent recovery of the PHAs from the cell mass.

For further details, reference can be made, for example, to patent applications WO 99/23146, WO 2011/045625 and WO 2015/015315. Suitable substrates for the production of PHAs by fermentation can be obtained in particular from the processing of plants, for example juices, molasses, pulps from the processing of sugar beet, sugar cane.

These substrates generally contain, in addition to sucrose and other carbohydrates, organic growth factors, nitrogen, phosphorus and/or other minerals which are useful as nutrients for cell growth.

An alternative is glycerol, a low-cost organic carbon source, as it is a by-product of biodiesel production (see, for example, U.S. Pat. No. 8,956,835 B2).

Advantageously, PHA also has a further peculiar and relevant characteristic for the purposes of the present disclosure: the barrier property. PHAs are in fact characterized by low permeability to oxygen, carbon dioxide and above all to water vapour. Advantageously, this allows creating an effective semi-permeable layer with reduced thickness.

According to a preferred embodiment of the present disclosure, the coating layer of PHA has a substantially constant thickness, so as to guarantee an effective barrier on the entire surface of the fertilizer granule. This coating layer of PHA having a substantially constant thickness is preferably obtainable by adopting suitable coating techniques, as better illustrated below. "Substantially constant thickness" is intended as a thickness which can vary from point to point by no more than 20% with respect to the average thickness. This evaluation can be carried out by analysing images of sections of the fertilizer granules according to the disclosure with an optical microscope or a scanning electron microscope (SEM).

In a preferred embodiment, the layer comprising at least one PHA further comprises at least one adhesive agent. The adhesive agent is preferably selected from: hydroxypropyl methylcellulose (HPMC), pectin, sulfonated lignin, or mixtures thereof.

In a particularly preferred embodiment, the adhesive agent is selected from: fatty acids C$_6$-C$_{26}$, more preferably C$_8$-C$_{22}$, saturated or unsaturated, or glycerides thereof (monoglycerides, diglycerides or triglycerides), and mixtures thereof. Particularly preferred are: caprylic acid, lauric acid, myristic acid, palmitic acid, stearic acid, or glycerides thereof (in particular triglycerides), and mixtures thereof. These products can be of animal or vegetable origin.

The function of the adhesive agent is mainly to improve the adhesion of the PHA to the nitrogen fertilizer. The Applicant has in fact noticed that PHA alone tends to distribute itself in a non-homogeneous way on the surface of the fertilizer granule, in particular urea, due to a scarce compatibility between the two products. The addition of the adhesive agent has the effect of improving homogeneity of the coating and therefore the barrier effect exerted by the PHA.

Preferably, the adhesive is added in an amount comprised between 0.05% w/w and 5% w/w, more preferably between 0.1% w/w and 3% w/w, with respect to the weight of the PHA.

According to a preferred embodiment of the present disclosure, the layer comprising at least one PHA is further coated by at least one sealing layer. The main function of the sealing layer is to reduce the passage of water through the PHA layer, thus further slowing down the release of fertilizer into the environment.

Preferably the sealing layer can comprise a polysaccharide selected for example from: ethylcellulose, chitosan, pectin or mixtures thereof.

In a particularly preferred embodiment, the sealing layer comprises one PHA, more preferably PHB, mixed with the cellular residue resulting from the microbial fermentation with which the PHA is produced. This sealing layer is then obtained by coating the fertilizer particles, previously coated with the PHA, with a suspension of PHA obtained by microbial fermentation, preferably after homogenization, without being subjected to purification and/or drying. It is believed that this product, which will be referred to below with the abbreviation DBX, is particularly effective as a sealant, and is characterized by high biodegradability, as it is made up of non-synthetic materials, such as the PHA and cellular residues of the microorganisms used for the fermentation (proteins, nucleic acids, polysaccharides, etc.).

A second aspect of the present disclosure relates to a process for producing a slow release fertilizer composition according to the present disclosure, which comprises:

introducing a quantity of particles of a nitrogen fertilizer into a device adapted to keep said particles in motion;

spraying an aqueous suspension of at least one PHA inside the device, so as to deposit said aqueous suspension on the surface of the moving particles;

drying the moving particles on which the aqueous suspension has been deposited, so as to obtain the layer comprising at least one PHA.

Optionally, the process according to the present disclosure, between the step of spraying and that of drying, can further comprise a step of spraying an aqueous suspension or solution of a sealant inside the device, in particular of a polysaccharide selected from: ethylcellulose, chitosan, pectin, or mixtures thereof, so as to deposit said aqueous suspension or solution on the surface of the moving particles coated with said at least one PHA.

As regards the device adapted to keep the particles moving, this is preferably a fluid-bed device. The device is well known in the art, widely used for producing the coating of various types of materials in subdivided form (for example tablets in the pharmaceutical sector), according to a process also known as "Wurster process".

In more detail, the fluid-bed device comprises a truncated conical basket with a vertical axis inside which a tubular insert adjustable in height, called "Wurster tube", is positioned coaxially. A net is positioned at the lower base of the basket, the mesh of which has dimensions such as to allow the passage of an air flow, but at the same time prevent the fall of the particles to be coated. There is an air flow distribution plate below the net which allows the latter to concentrate towards the centre of the basket. A spray gun crosses the distribution plate and the support net from the bottom upwards. The tip of the gun penetrates inside the Wurster tube. The upper portion of the basket continues with a cylindrical portion, called expansion chamber, inside which cartridge filters are housed. A fan ensures the presence of a constant air flow inside the machine.

The particles to be coated are loaded inside the basket and moved in suspension by the air flow following a circular path, rising up inside the Wurster tube and going down along the external portion of the tube for the entire duration of the process. During the passage inside the tube the particles are hit by the jet emitted by the spray gun which sprays the suspension that will constitute the coating layer thereon.

As an alternative to the fluid-bed device, it is possible to use a basket (also known as "coating pan") generally having a cylindrical or spheroidal shape, which rotates around an inclined axis. The particles to be coated are inserted inside the basket, which can be perforated or not, and are kept moving inside the basket itself. If the basket is not perforated, a mobile ploughshare is inserted inside the bed created by the particles and air is sucked in or sent through it. If the basket is perforated, the air is conveyed inside the basket thanks to two external tubes: the suction tube positioned under the particle bed and the air delivery tube positioned on the opposite side from the bed. The particles are dragged upwards thanks to the rotation of the basket. A spray gun sprays the coating liquid on the moving particles inside the basket.

In both of the processes described above, the spraying step is preferably carried out at a temperature comprised between 20° C. and 80° C. The time inside the device can vary within wide limits, depending on the specific device used, the process conditions and the thickness of the coating to be obtained.

The use of an aqueous suspension of PHA as a coating liquid, instead of a solution of PHA, allows obtaining a substantially uniform coating layer and avoids the use of organic solvents, such as chloroform, in which the PHA can be dissolved, being insoluble in water.

The following examples of embodiment are provided for the sole purpose of illustrating the present disclosure and are not to be understood in a sense limiting the scope of protection defined by the appended claims.

EXAMPLE 1. PREPARATION OF THE SOLUTION COMPRISING PHB AND HPMC (VIVACOAT®)

An amount of aqueous suspension of PHB at 20% by weight was weighed in a 1 L beaker to obtain 72.2 g of PHB.

Separately, in a vessel, 10.3 g of Vivacoat®, JRS Pharma (formulation containing: HPMC, talc, dye and PEG) were weighed.

Mass ratio PHB:Vivacoat®=7:1

Water was added inside the beaker in order to obtain a concentration of solids in the final suspension (also including the Vivacoat® product which will be added later) equal to 15% by weight.

The diluted suspension contained inside the beaker was stirred using a mechanical stirrer with inclined blade impeller.

Subsequently the previously weighed Vivacoat® product was added gradually under stirring, with an addition rate such as to avoid the formation of lumps.

The beaker was covered and the suspension was left under stirring for at least 30 min.

EXAMPLE 2. PRODUCTION OF A SLOW RELEASE FERTILIZER COMPOSITION CONSISTING OF UREA PARTICLES COATED, BY MEANS OF A COATING PAN, WITH A LAYER OF PHB (5% BY WEIGHT) AND HPMC 1425 g of urea particles were weighed, having an average diameter of about 4.5 mm.

A coating pan with a 4.5 L basket was mounted, in which the urea particles were loaded. The basket was given a rotation of 20 rpm.

The spray gun was positioned 10 cm from the surface of the particle bed, along a direction perpendicular to the bed itself.

The basket rotation was activated in "jog" mode: cycles of 5 sec of rotation at 5 rpm and 10 sec during which the basket was stopped.

The introduction of the hot air flow was then started (Q=100 m$^3$/h) (inlet air temperature=60° C.). The device was heated to reach an outlet air temperature of approximately 50° C. The peristaltic pump tube, connected to the spray gun of the coating pan, was inserted inside the suspension contained in the beaker of Example 1.

The rotation of the coating pan basket was set at 20 rpm. The spray emitted by the spray gun was activated via the peristaltic pump at a speed of 12 rpm. The spray pressure was set at about 1.2 bar and the gun pattern pressure at about 1 bar.

The spraying step was continued until 500 g of suspension was sprayed.

Once the spraying step was finished, the inlet air temperature was brought to 95° C. and then maintained for 2 hours. Subsequently, the air heating was turned off and the outlet air temperature was left to lower to a value below 50° C.

A composition according to the present disclosure was thus obtained consisting of urea particles coated with a layer of PHB (5% by weight with respect to the weight of the urea) mixed with HPMC as an adhesive agent.

DETAILED DESCRIPTION OF THE DRAWINGS

Figure 1A:
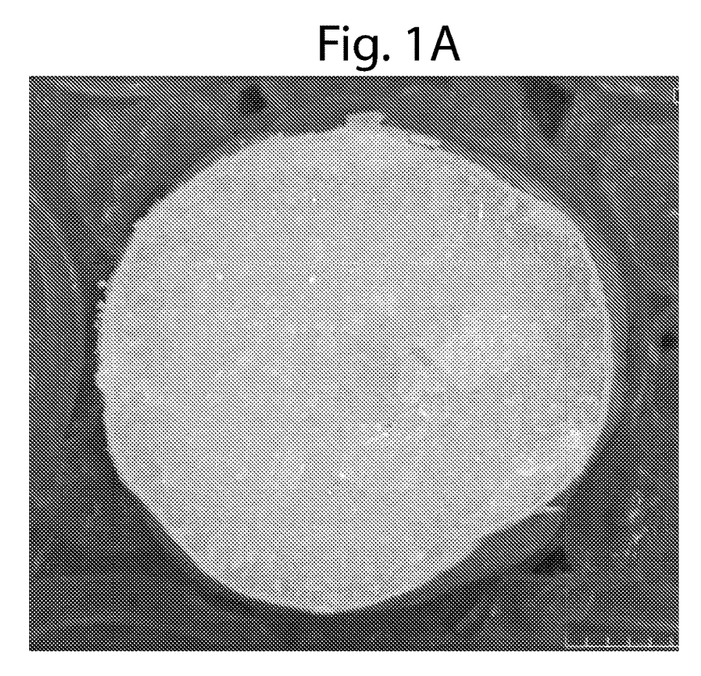
FIG. 1A shows an image, obtained by means of an optical microscope, of a cross section of a particle produced according to Example 2.
Figure 1B:
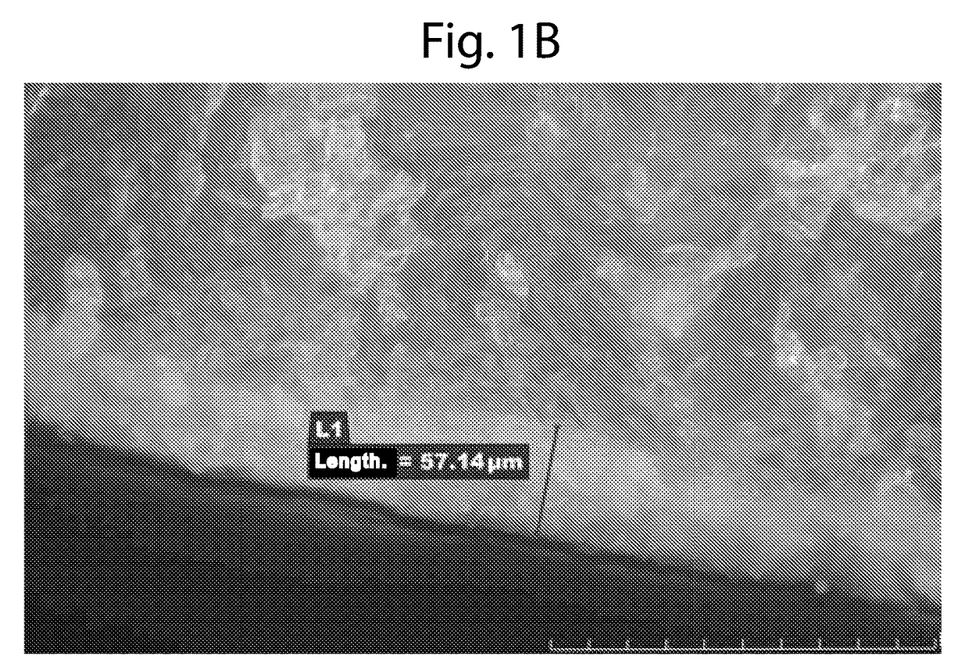
FIG. 1B shows a detail of the section of FIG. 1A in which the layer of PHB and HPMC is clearly visible and has a thickness of 57.14 μm.
Figure 2A:
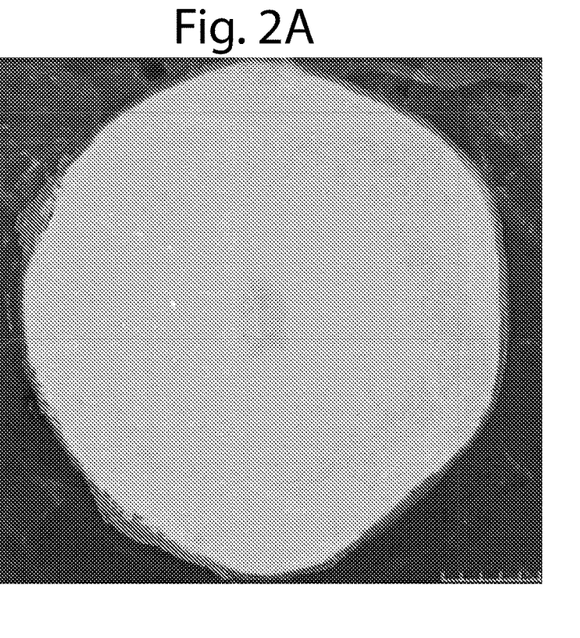
FIG. 2A shows an image, obtained by means of an optical microscope, or a cross section of a particle produced according to Example 5.
Figure 2B:
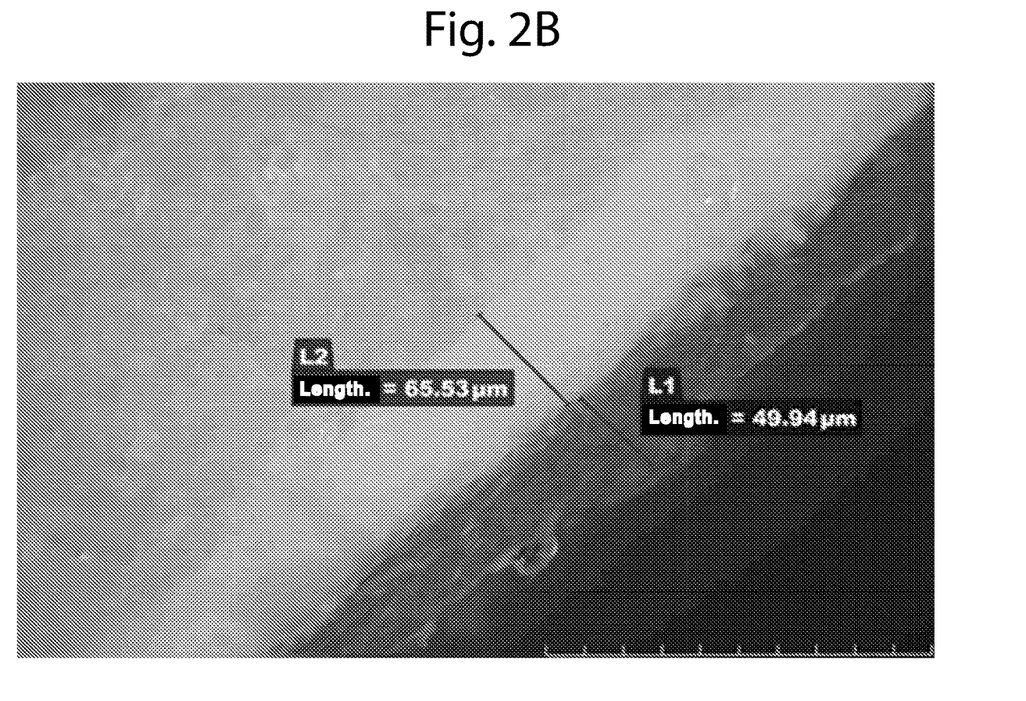
FIG. 2B instead shows a detail of the section of FIG. 2A in which both the PHB and HPMC layer and the sealing layer of EC are clearly visible and have a thickness of 65.53 μm and 49.94 μm, respectively.
Figure 3A:
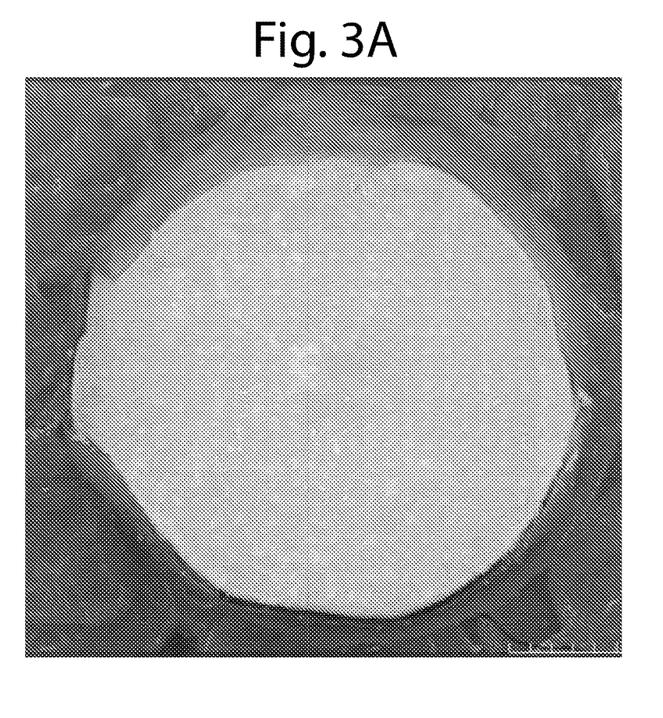
FIG. 3A shows an image, obtained by means of an optical microscope, of a cross section of a particle produced according to Example 8.
Figure 3B:
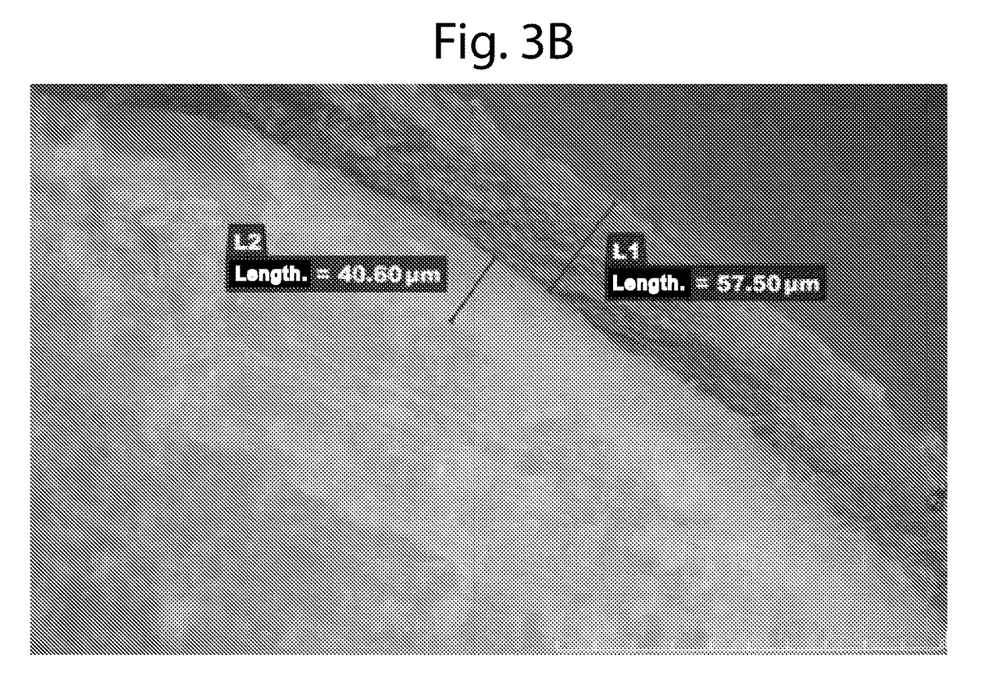
FIG. 3B instead shows a detail of the section of FIG. 3A in which both the PHB and HPMC layer and the sealing layer of chitosan are clearly visible and have a thickness of 40.60 μm and 57.50 μm, respectively.
Figure 4:
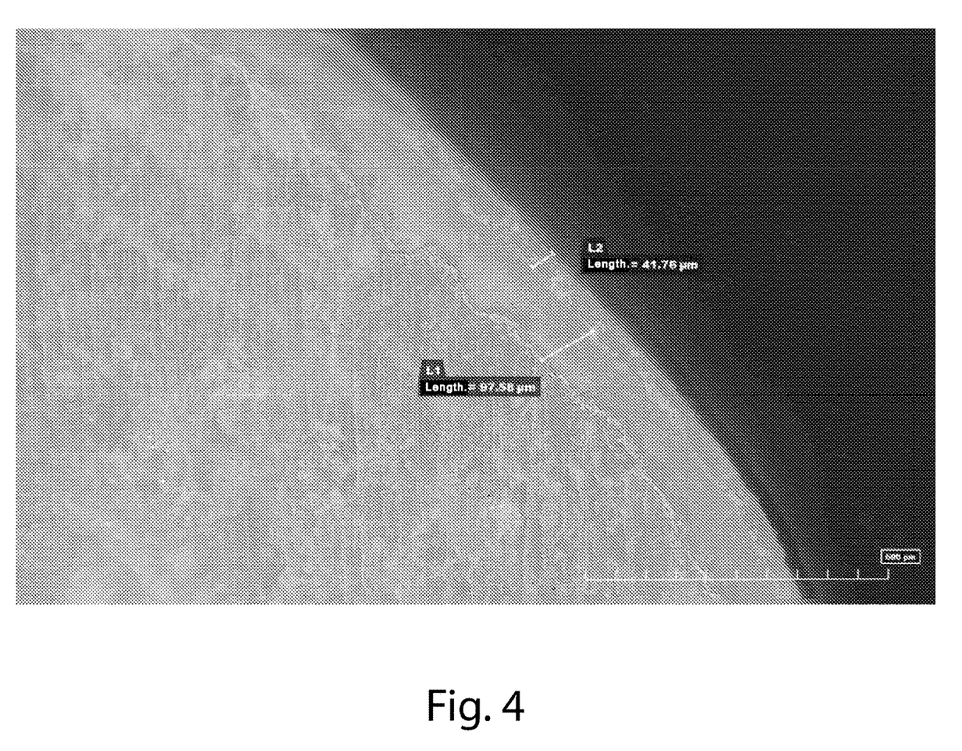
FIG. 4 shows an image, obtained by means of an optical microscope, of a detail of a cross section of a particle produced according to Example 11.

EXAMPLE 3. PRODUCTION OF A SLOW RELEASE FERTILIZER COMPOSITION CONSISTING OF UREA PARTICLES COATED, BY MEANS OF THE WURSTER PROCESS, WITH A LAYER OF PHB (5% BY WEIGHT) AND HPMC 1425 g of urea particles were weighed, having an average diameter of about 1.5 mm.

The urea particles were loaded inside a fluid-bed device equipped with a truncated conical basket for the realization of the Wurster process.

The introduction of the hot air flow was then started with a range Q=80 $m^3$/h (inlet air temperature=70° C.). The device was heated until reaching a urea particle temperature of about 55° C.

The peristaltic pump tube connected to the spray gun of the fluid-bed device was inserted inside the suspension contained in the beaker of Example 1.

The spray emitted by the spray gun was activated via the peristaltic pump at a speed of 10 rpm. The spray pressure was set at about 1.5 bar and the acceleration pressure at about 1.5 bar.

The spraying step was continued until 500 g of suspension was sprayed.

Once the spraying step was finished, the inlet air temperature was brought to 95° C. and then maintained for 2 hours. Subsequently, the air heating was turned off and the outlet air temperature was left to lower to a value below 50° C.

A composition according to the present disclosure was thus obtained consisting of urea particles coated with a layer of PHB (5% by weight with respect to the weight of the urea) mixed with HPMC as adhesive agent.

EXAMPLE 4. PREPARATION OF AN ETHYL CELLULOSE SUSPENSION (SURELEASE®)

An amount of Surelease®, Colorcon (aqueous suspension of ethylcellulose (EC) containing medium chain triglycerides, oleic acid and suspension stabilizers) was weighed in a 1 L beaker to obtain 82.5 g of solids. The suspension was diluted with water so as to obtain a concentration of solids equal to 15% by weight.

The diluted suspension contained inside the beaker was stirred using a mechanical stirrer with inclined blade impeller.

The beaker was covered and the suspension was left under stirring for at least 10 min.

EXAMPLE 5. PRODUCTION OF A SLOW RELEASE FERTILIZER COMPOSITION CONSISTING OF UREA PARTICLES COATED, BY MEANS OF A COATING PAN, WITH A LAYER OF PHB (5% BY WEIGHT) AND HPMC, AND WITH A SEALING LAYER OF EC 1350 g of urea particles were weighed, having an average diameter of about 4.5 mm.

A coating pan with a 4.5 L basket was mounted, in which the urea particles were loaded. The basket was given a rotation of 20 rpm.

The spray gun was positioned 10 cm from the surface of the particle bed, along a direction perpendicular to the bed itself.

The basket rotation was activated in "jog" mode: cycles of 5 sec of rotation at 5 rpm and 10 sec during which the basket was stopped.

The introduction of the hot air flow was then started with a range Q=100 $m^3$/h (inlet air temperature=60° C.). The device was heated to reach an outlet air temperature of approximately 50° C. The peristaltic pump tube, connected to the spray gun of the coating pan, was inserted inside the suspension contained in the beaker of Example 1.

The rotation of the coating pan basket was set at 20 rpm. The spray emitted by the spray gun was activated via the peristaltic pump at a speed of 12 rpm. The spray pressure was set at about 1.2 bar and the gun pattern pressure at about 1 bar.

The spraying step was continued until 500 g of suspension was sprayed.

Once this first spraying step was finished, after 10 minutes of stop, the sealing layer of EC was sprayed. For this purpose, the peristaltic pump tube connected to the spray gun of the coating pan was moved and inserted inside the suspension contained in the beaker of Example 4.

The rotation of the coating pan basket was set at 20 rpm. The spray emitted by the spray gun was activated via the peristaltic pump at a speed of 12 rpm. The spray pressure was set at about 1.2 bar and the gun pattern pressure at about 1 bar.

The spraying step was continued until 500 g of suspension was sprayed.

After this second spraying step was finished, the inlet air temperature was brought to 80° C. and then maintained for 2 hours. Subsequently, the air heating was turned off and the outlet air temperature was left to lower to a value below 50° C.

A composition according to the present disclosure was thus obtained consisting of urea particles coated, by means of a coating pan, with a layer of PHB (5% by weight with respect to the weight of the urea) mixed with HPMC as an adhesive agent, and with a sealing layer of EC.

EXAMPLE 6. PRODUCTION OF A SLOW RELEASE FERTILIZER COMPOSITION CONSISTING OF UREA PARTICLES COATED, BY MEANS OF THE WURSTER PROCESS, WITH A LAYER OF PHB (5% BY WEIGHT) AND HPMC, AND WITH A SEALING LAYER OF EC 1350 g of urea particles were weighed, having an average diameter of about 1.5 mm.

The urea particles were loaded inside a fluid-bed device equipped with a truncated conical basket for the realization of the Wurster process.

The introduction of the hot air flow was started with a range Q=80 m$^3$/h (inlet air temperature=70° C.) The device was heated until reaching a urea particle temperature of about 55° C.

The peristaltic pump tube connected to the spray gun of the fluid-bed device was inserted inside the suspension contained in the beaker of Example 1.

The spray emitted by the spray gun was activated via the peristaltic pump at a speed of 10 rpm. The spray pressure was set at about 1.5 bar and the acceleration pressure at about 1.5 bar.

The spray step was continued until 500 g of suspension was sprayed.

Once this first spraying step was finished, after 10 minutes of waiting, the sealing layer of EC was sprayed. For this purpose, the peristaltic pump tube connected to the spray gun of the fluid-bed device was moved and inserted inside the suspension contained in the beaker of Example 4. The spray emitted by the spray gun was activated via the peristaltic pump at a speed of 10 rpm. The spray pressure was set at about 1.5 bar and the acceleration pressure at about 1.5 bar.

After this second spraying step was finished, the inlet air temperature was brought to 80° C. and then maintained for 2 hours. Subsequently, the air heating was turned off and the outlet air temperature was left to lower to a value below 50° C.

A slow release fertilizer composition was thus obtained consisting of urea particles coated, by means of the Wurster process, with a layer of PHB (5% by weight with respect to the weight of the urea) mixed with HPMC as an adhesive agent, and with a sealing layer of EC.

EXAMPLE 7. PREPARATION OF THE CHITOSAN SOLUTION 4275 g of water and 135 g of acetonitrile were weighed in a 5 L beaker. The solution contained inside the beaker was stirred using a mechanical stirrer with inclined blade impeller. 90 g of chitosan powder were gradually added to the solution.

The beaker was covered and the solution was left under stirring for a minimum of 4 hours.

EXAMPLE 8. PRODUCTION OF A SLOW RELEASE FERTILIZER COMPOSITION CONSISTING OF UREA PARTICLES COATED, BY MEANS OF A COATING PAN, WITH A LAYER OF PHB (5% BY WEIGHT) AND HPMC, AND WITH A SEALING LAYER OF CHITOSAN 1350 g of urea particles were weighed, having an average diameter of about 4.5 mm.

A coating pan with a 4.5 L basket was mounted, in which the urea particles were loaded. The basket was given a rotation of 20 rpm.

The spray gun was positioned 10 cm from the surface of the particle bed, along a direction perpendicular to the bed itself.

The basket rotation was activated in "jog" mode: cycles of 5 sec of rotation at 5 rpm and 10 sec during which the basket was stopped.

The introduction of the hot air flow was then started with a range Q=100 m$^3$/h (inlet air temperature=60° C.). The device was heated to reach an outlet air temperature of approximately 50° C. The peristaltic pump tube, connected to the spray gun of the coating pan, was inserted inside the suspension contained in the beaker of Example 1.

The rotation of the coating pan basket was set at 20 rpm. The spray emitted by the spray gun was activated via the peristaltic pump at a speed of 12 rpm. The spray pressure was set at about 1.2 bar and the gun pattern pressure at about 1 bar.

The spray step was continued until 500 g of suspension was sprayed.

Once this first spraying step was finished, after 10 minutes of waiting, the sealing layer of chitosan was sprayed. For this purpose, the peristaltic pump tube connected to the spray gun of the coating pan was moved and inserted inside the solution contained in the beaker of Example 7.

The rotation of the coating pan basket was set at 20 rpm. The spray emitted by the spray gun was activated via the peristaltic pump at a speed of 12 rpm. The spray pressure was set at about 1.2 bar and the gun pattern pressure at about 1 bar.

The spray step was continued until 3750 g of solution was sprayed.

After this second spraying step was finished, the inlet air temperature was brought to 80° C. and then maintained for 2 hours. Subsequently, the air heating was turned off and the outlet air temperature was left to lower to a value below 50° C.

A slow release fertilizer composition was thus obtained consisting of urea particles coated, by means of a coating pan, with a layer comprising PHB (5% by weight with respect to the weight of the urea) mixed with HPMC as an adhesive agent, and with a sealing layer of chitosan.

EXAMPLE 9. PRODUCTION OF A SLOW RELEASE FERTILIZER COMPOSITION CONSISTING OF UREA PARTICLES COATED, BY MEANS OF THE WURSTER PROCESS, WITH A LAYER OF PHB (5% BY WEIGHT) AND HPMC, AND WITH A SEALING LAYER OF CHITOSAN 1350 g of urea particles were weighed, having an average diameter of about 1.5 mm.

The urea particles were loaded inside a fluid-bed device equipped with a truncated conical basket.

The introduction of the hot air flow was started with a range Q=80 m$^3$/h (inlet air temperature=70° C.)

The device was heated until reaching a urea particle temperature of about 55° C.

The peristaltic pump tube connected to the spray gun of the fluid-bed device was inserted inside the suspension contained in the beaker of Example 1.

The spray emitted by the spray gun was activated via the peristaltic pump at a speed of 10 rpm. The spray pressure was set at about 1.5 bar and the acceleration pressure at about 1.5 bar.

The spray step was continued until 500 g of suspension was sprayed.

Once this first spraying step was finished, after 10 minutes of waiting, the sealing layer of chitosan was sprayed. For this purpose, the peristaltic pump tube connected to the spray gun of the fluid-bed device was moved and inserted inside the solution contained in the beaker of Example 7. The spray emitted by the spray gun was activated via the peristaltic pump at a speed of 10 rpm. The spray pressure was set at about 1.5 bar and the acceleration pressure at about 1.5 bar.

The spray step was continued until 3750 g of solution was sprayed.

After this second spraying step was finished, the inlet air temperature was brought to 80° C. and then maintained for 2 hours. Subsequently, the air heating was turned off and the outlet air temperature was left to lower to a value below 50° C.

A slow release fertilizer composition was thus obtained consisting of urea particles coated, by means of the Wurster process, with a layer of PHB (5% by weight with respect to the weight of the urea) mixed with HPMC as an adhesive agent, and with a sealing layer of chitosan.

EXAMPLE 10. PREPARATION OF A SUSPENSION OF PHB AND PALM OIL/STEARIC ACID

An amount of palm oil equal to 40.5 g and an amount of stearic acid equal to 4.5 g was weighed in a 1 L beaker. Demineralised water (135 g) was added to the solids mixture until a solids concentration equal to 25% by weight was obtained. The heterogeneous mixture was heated to 60° C. The biphasic suspension obtained was stirred by means of a mechanical blade stirrer until an unstable emulsion was obtained, to which an aqueous solution of ammonia at 28% by weight (1.2 ml) was added, obtaining a thick, white aqueous suspension. The ammonia was added to stabilize the emulsion. An amount of aqueous suspension of PHB at 20% by weight was added to this suspension in order to obtain 105 g of PHB. Water was then added inside the beaker in order to obtain a concentration of solids in the final suspension equal to 15% by weight.

EXAMPLE 11. PRODUCTION OF A SLOW RELEASE FERTILIZER COMPOSITION CONSISTING OF UREA PARTICLES COATED, BY MEANS OF A COATING PAN, WITH A LAYER OF PHB (7% BY WEIGHT) AND PALM OIL/STEARIC ACID (3% BY WEIGHT) AND A SEALING LAYER OF DBX (2%)

1320 g of urea particles were weighed, having an average diameter of about 4.5 mm.

A coating pan with a 4.5 L basket was prepared, in which the urea particles were loaded. The basket was given a rotation of 20 rpm.

The spray gun was positioned 10 cm from the surface of the particle bed, along the direction perpendicular to the bed itself.

The basket rotation was activated in "jog" mode: cycles of 5 sec of rotation at 5 rpm and 10 sec during which the basket was stopped.

The introduction of the hot air flow was then started (Q=100 m³/h, inlet air temperature=60° C.). The device was heated to reach an outlet air temperature of approximately 50° C. The peristaltic pump tube, connected to the spray gun of the coating pan, was inserted inside the suspension contained in the beaker of Example 10.

The rotation of the coating pan basket was set at 20 rpm. The spray emitted by the spray gun was activated via the peristaltic pump at a speed of 12 rpm. The spray pressure was set at about 1.2 bar and the gun pattern pressure at about 1 bar.

The spraying step was continued until 1000 g of suspension was sprayed.

Once this first spraying step was finished, after about 1 minute of waiting, the sealing layer of DBX was sprayed. For this purpose, the peristaltic pump tube connected to the spray gun was moved and inserted inside the DBX suspension. The DBX consisted of a suspension of PHB obtained from microbial fermentation after homogenization, without being subjected to purification and/or drying. The DBX contained 16% by weight of solids.

The rotation of the coating pan basket was set at 20 rpm. The spray emitted by the spray gun was activated via the peristaltic pump at a speed of 12 rpm. The spray pressure was set at about 1.2 bar and the gun pattern pressure at about 1 bar.

The spraying step was continued until 184 g of suspension was sprayed.

After this second spraying step was finished, the inlet air temperature was brought to 95° C. and then maintained for 1 hour. Subsequently, the air heating was turned off and the outlet air temperature was left to lower to a value below 50° C.

A composition according to the present disclosure was thus obtained consisting of urea particles coated, by means of a coating pan, with a layer of PHB (7% by weight with respect to the weight of the urea) mixed with palm oil/stearic acid (3% by weight compared to the weight of the urea) and with a sealing layer of DBX (2% by weight compared to the weight of the urea).

EXAMPLE 12. PRODUCTION OF A SLOW RELEASE FERTILIZER COMPOSITION CONSISTING OF UREA PARTICLES COATED, BY MEANS OF THE WURSTER PROCESS, WITH A LAYER OF PHB (7% BY WEIGHT) AND PALM OIL/STEARIC ACID (3% BY WEIGHT) AND A SEALING LAYER OF DBX (2%)

1320 g of urea particles were weighed, having an average diameter of about 1.5 mm.

The urea particles were loaded inside a fluid-bed device equipped with a truncated conical basket for the realization of the Wurster process.

The introduction of the hot air flow was started with a range Q=80 m³/h (inlet air temperature=70° C.) The device was heated until reaching the urea particle temperature of about 55° C.

The peristaltic pump tube connected to the spray gun of the fluid-bed device was inserted inside the suspension contained in the beaker of Example 10.

The spray emitted by the spray gun was activated via the peristaltic pump at a speed of 10 rpm. The spray pressure was set at 1.5 bar and the acceleration pressure at 1.5 bar.

The spray step was continued until 1000 g of suspension was sprayed.

Once this first spraying step was finished, after about 1 minute of waiting, the sealing coating layer of DBX was sprayed (identical to that used for Example 11). For this purpose, the peristaltic pump tube connected to the spray gun of the fluid-bed device was moved and inserted inside the suspension of DBX. The spray emitted by the spray gun was activated via the peristaltic pump at a speed of 10 rpm. The spray pressure was set at 1.5 bar and the acceleration pressure at 1.5 bar.

After this second spraying step was finished, the inlet air temperature was brought to 80° C. and then maintained for 2 hours. Subsequently, the air heating was turned off and the temperature was left to lower to a value below 50° C.

A slow release fertilizer composition was thus obtained consisting of urea particles coated, by means of the Wurster process, with a layer of PHB (7% by weight with respect to the weight of the urea) mixed with palm oil/stearic acid (3% by weight with respect to the weight of the urea) and with a sealing layer of DBX (2% by weight with respect to the weight of the urea).

EXAMPLE 13. EVALUATION OF THE RELEASE OF UREA OVER TIME

The urea release was assessed according to standard EN13266:2001. In further detail, 10 g of the slow release fertilizer composition obtained according to Example 2 were added to a beaker containing 500 mL of distilled water at 25° C. The suspension thus obtained was placed under stirring (300 rpm), by means of a magnetic stirrer, and maintained at a temperature of 25° C. by means of a heating plate. After 24 hours, a 2 mL aliquot of the suspension water was withdrawn by means of a calibrated pipette. For each aliquot withdrawn, the same volume of distilled water was reinserted inside the beaker. The amount of urea present in each aliquot was determined by spectrophotometric procedure by measuring the absorption of the chromophore resulting from the quantitative reaction of the urea with p-dimethyl amino benzaldehyde (J. Chil. Chem. Soc. 2017, 62, 3538). In further detail, 300 mg of p-dimethyl amino benzaldehyde (DMAB) were weighed and dissolved in acetonitrile in a 100 mL volumetric flask. The calibration line was constructed starting from aqueous solutions having a known concentration of urea comprised between 4 mM and 40 mM. The chromophore formation reaction was induced by mixing 1.8 mL of DMAB solution, 1 mL of solution with a known concentration of urea and 64 μL of 37% HCl. The solution thus obtained was manually stirred for 30 sec and allowed to react statically for 3 min. The absorbance of the newly formed chromophore (maximum uptake peak at 420 nm) was measured using a double-beam UV-Vis spectrophotometer using as reference a mixture consisting of 1.8 mL of DMAB, 1 mL of water and 64 μL of 37% HCl. The calibration line was constructed by putting the absorbance at 420 nm as a function of the urea concentration.

For the determination of urea in the various aliquots, 1 mL of unknown solution and 64 μL of 37% HCl were added to 1.8 mL of DMAB solution, following the operations described above for the standard urea solutions. The amount of urea present in the individual aliquots was determined by measuring the absorbance at 420 nm and correlating it to the concentration of urea by means of the calibration line.

The measurements were also repeated for the fertilizer compositions obtained according to Examples 3, 5, 6, 8, 9 and 11. Table 1 shows the urea values released over time (after 24 hours).

TABLE 1

| Product | Release %, 24 h |
|---|---|
| Example 2 | 45 |
| Example 3 | 50 |
| Example 5 | 38 |
| Example 6 | 41 |
| Example 8 | 43 |
| Example 9 | 45 |
| Example 11 | 90 |

The invention claimed is:

1. A slow release fertilizer composition comprising particles of a nitrogen fertilizer coated with at least one layer comprising at least one polyhydroxyalkanoate (PHA), said at least one layer having an average thickness comprised between 1 μm and 200 μm, wherein the layer comprising at least one PHA is further coated by at least one sealing layer, wherein the sealing layer comprises PHA, mixed with the cellular residue deriving from the microbial fermentation with which the PHA is produced.

2. The composition according to claim 1, wherein the nitrogen fertilizer particles have an average size comprised between 0.5 mm and 20 mm.

3. The composition according to claim 1, wherein the PHA is present in an amount comprised between 0.5% and 15% by weight, with respect to the weight of the fertilizer.

4. The composition according to claim 1, wherein the nitrogen fertilizer is water soluble and is selected from: urea, potassium nitrate, ammonium nitrate, ammonium phosphate, mixtures of fertilizers N:P:K, or mixtures thereof.

5. The composition according to claim 1, wherein the PHA is a polymer containing repetitive units of formula (I):

$$-O-CHR_1-(CH_2)_n-CO- \qquad (I)$$

where:
R$_1$ is chosen among: alkyls $C_1$-$C_{12}$, cycloalkyls $C_4$-$C_{16}$, alkenyls $C_2$-$C_{12}$, optionally substituted with at least one group chosen from: halogen (F, Cl, Br), —CN, —OH, —OOH, —OR, —COOR (R═$C_1$-$C_4$ alkyl, benzyl);
n is zero or an integer from 1 to 6.

6. The composition according to claim 5, wherein the PHA is a homopolymer, or a copolymer, or a terpolymer.

7. The composition according to claim 1, wherein the layer comprising at least one PHA has a substantially constant thickness.

8. The composition according to claim 1, wherein the layer comprising at least one PHA further comprises at least one adhesive agent.

9. The composition according to claim 8, wherein said at least one adhesive agent is selected from: hydroxypropyl methylcellulose (HPMC), pectin, sulfonated lignin, or mixtures thereof.

10. The composition according to claim 8, wherein said at least one adhesive agent is selected from: fatty acids $C_6$-$C_{26}$, saturated or unsaturated, and their glycerides (monoglycerides, diglycerides or triglycerides), and mixtures thereof.

11. The composition according to claim 8, wherein the adhesive agent is added in an amount comprised between 0.05% w/w and 5% w/w, with respect to the weight of the PHA.

12. The composition according to claim 1, wherein the sealing layer comprises a polysaccharide selected from: ethylcellulose, chitosan, pectin or mixtures thereof.

13. A process for producing a slow release fertilizer composition according to claim 1, the process including the following steps:

introducing a quantity of particles of a nitrogen fertilizer into a device adapted to keep said particles in motion;

spraying an aqueous suspension of at least one PHA inside the device, so as to deposit said aqueous suspension on the surface of the moving particles; and drying the moving particles on which the aqueous suspension has been deposited, so as to obtain the layer comprising at least one PHA;

wherein between the step of spraying and that of drying, a step is comprised of spraying an aqueous suspension or solution of a sealant inside the device, so as to deposit said aqueous suspension or solution on the surface of the moving particles coated with said at least one PHA;

wherein the sealant comprises PHA, mixed with the cellular residue deriving from the microbial fermentation with which the PHA is produced.

14. The process according to claim 13, wherein the device adapted to keep said particles in motion is a fluid-bed device or a basket that rotates around an axis.

15. The process according to claim 13, wherein the step of spraying is carried out at a temperature comprised between 20° C. and 80° C.

* * * * *